Nov. 2, 1965   E. G. SOLECKI   3,214,975
TEMPERATURE HUMIDITY INDEX MEASURING INSTRUMENT
Filed June 5, 1963   4 Sheets-Sheet 1
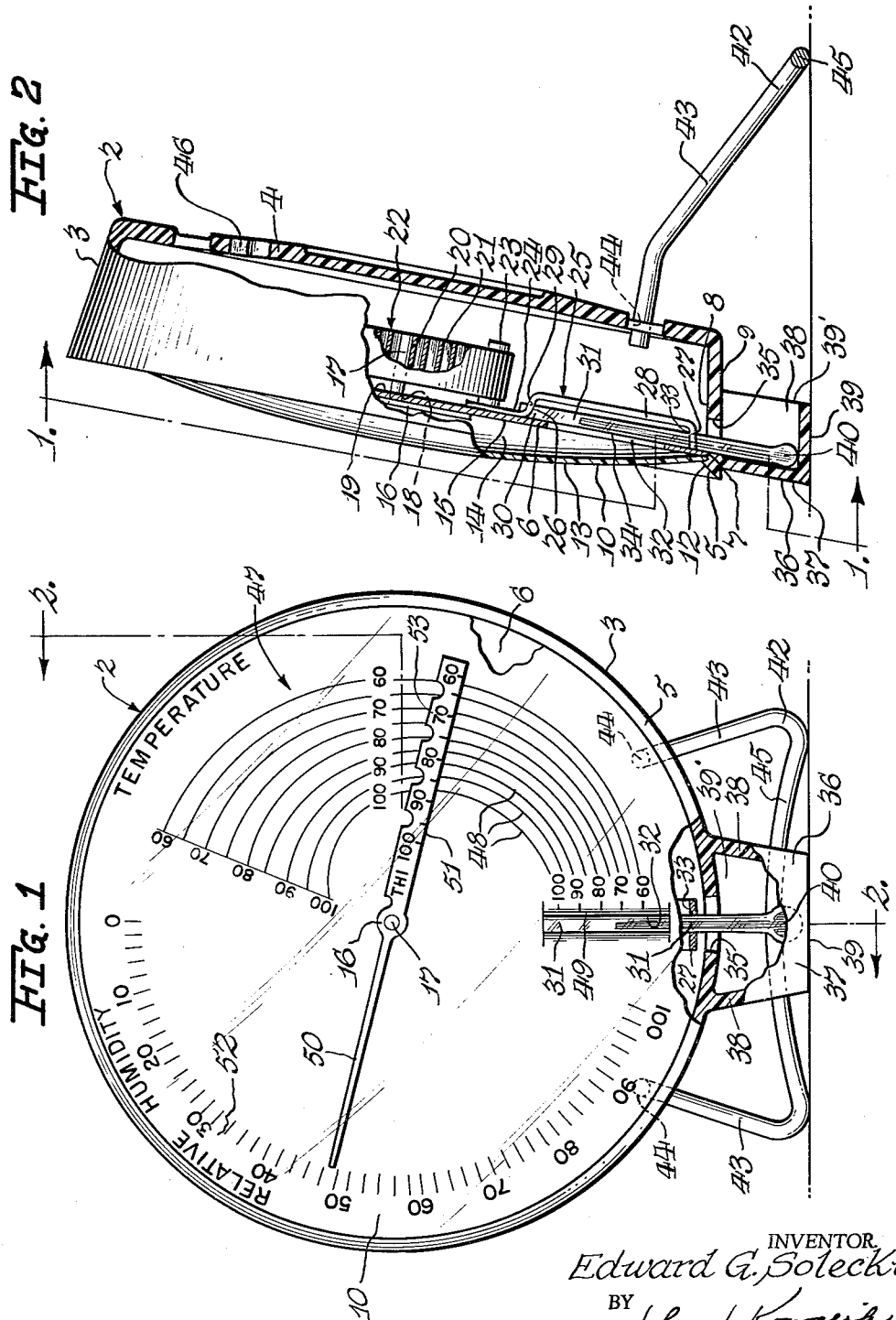
INVENTOR.
Edward G. Solecki
BY
Atty.

Nov. 2, 1965  E. G. SOLECKI  3,214,975
TEMPERATURE HUMIDITY INDEX MEASURING INSTRUMENT
Filed June 5, 1963  4 Sheets-Sheet 2
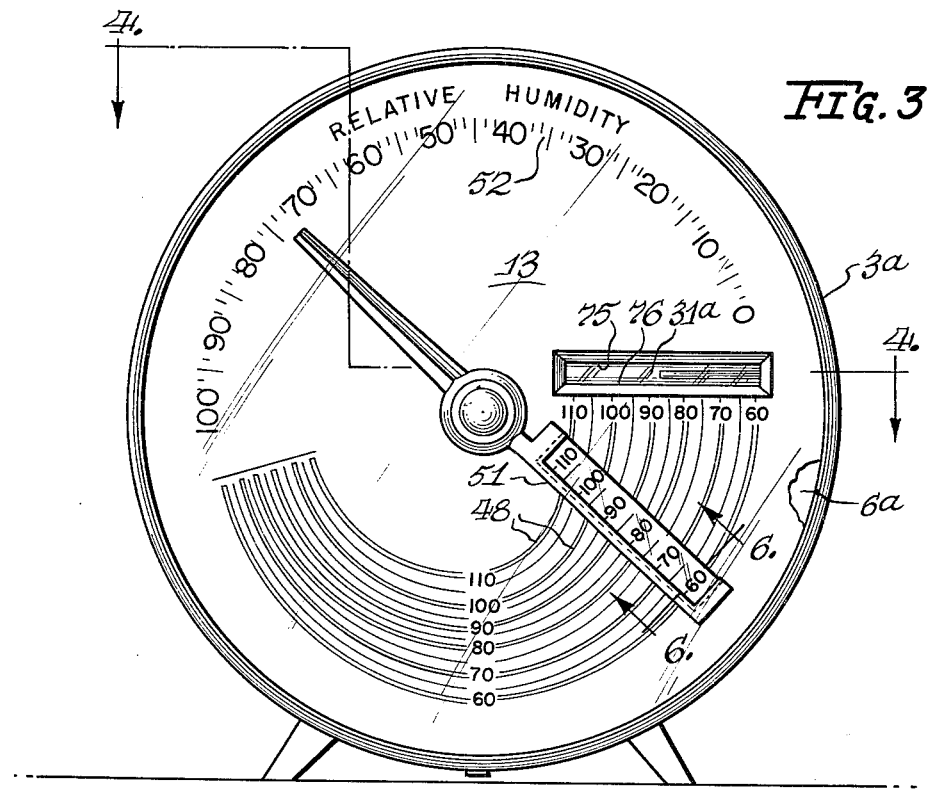
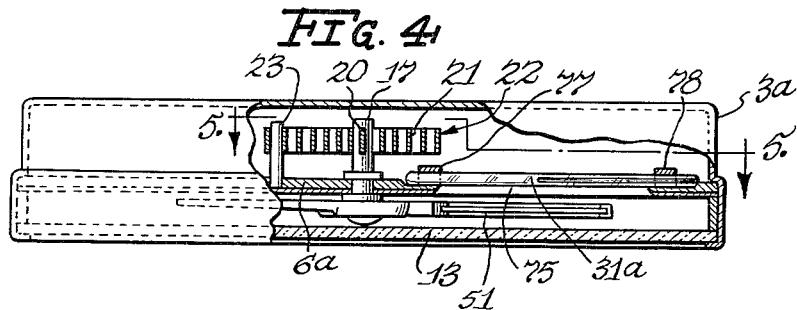
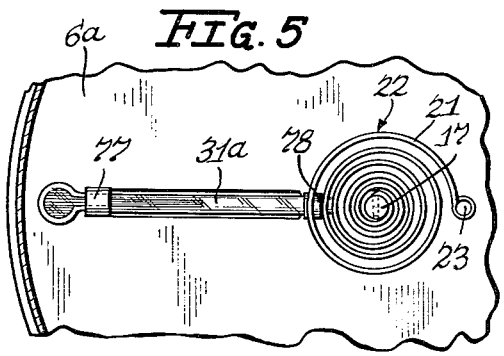
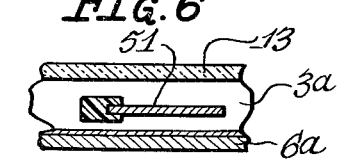
INVENTOR.
Edward G. Solecki
BY
John J. Kowalik
Atty.

Nov. 2, 1965 E. G. SOLECKI 3,214,975

TEMPERATURE HUMIDITY INDEX MEASURING INSTRUMENT

Filed June 5, 1963 4 Sheets-Sheet 3

INVENTOR.
Edward G. Solecki
BY
John J. Kowalik
Atty.

Nov. 2, 1965   E. G. SOLECKI   3,214,975
TEMPERATURE HUMIDITY INDEX MEASURING INSTRUMENT
Filed June 5, 1963   4 Sheets-Sheet 4
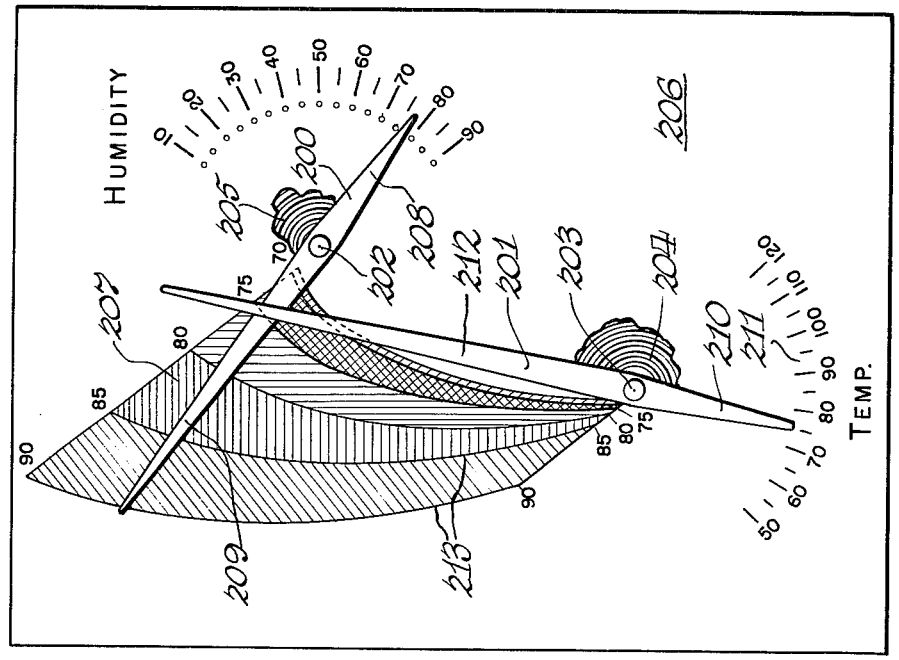
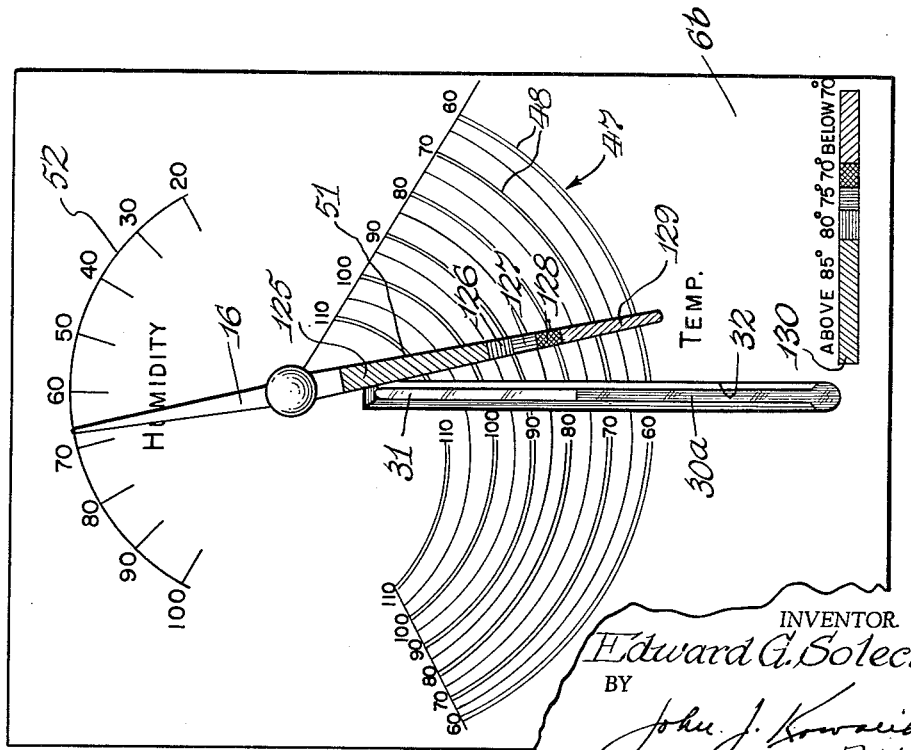
INVENTOR.
Edward G. Solecki
BY
John J. Kowalik
Atty.

United States Patent Office 3,214,975
Patented Nov. 2, 1965

3,214,975
TEMPERATURE HUMIDITY INDEX MEASURING INSTRUMENT
Edward G. Solecki, 4458 W. Gunnison St., Chicago, Ill.
Filed June 5, 1963, Ser. No. 285,700
9 Claims. (Cl. 73—336)

This invention is directed to a novel instrument combining a hygrometer and a thermometer into a single instrument which obtains a reading on an appropriate graph designated a temperature-humidity index scale.

The index is a scale of correlated interpretations of combinations of heat and humidity. As is well known there are two temperature readings available for atmospheric conditions at a particular moment, namely, the dry bulb temperature and the wet bulb temperature. The dry bulb temperature is the reading obtained from a thermometer which is dry and the wet bulb temperature is obtained by the evaporation of water applied to the bulb of the thermometer. Commonly the wet bulb and dry bulb temperatures are obtained by a sling psychrometer which comprises a pair of thermometers mounted securely on a support or frame to which a swivel handle is secured. The mercury bulb of one of these thermometers is fitted with a muslin covering which is saturated with water. The entire instrument is whirled rapidly and the water evaporating from the muslin obtains a cooling effect. The whirling is continued until no further temperature drop is obtained. The reading of the wet-bulb thermometer gives the wet-bulb temperature, while simultaneous air temperature is read from the other or dry-bulb thermometer.

Relative humidity is the percentage of moisture that the air contains compared with the water vapor the air at the particular temperature could hold when saturated.

Dew point is another indication of the amount of water vapor in the air. It is obtained by taking a sample of air with its water content and cooling this sample of air until moisture condenses. Then the temperature of this sample has reached its dew point.

These various readings are correlated in the instant instruments wherein the dry bulb-wet bulb average is related to the instant temperature and the resultant is termed the temperature-humidity index (THI) and is developed by the following equations:

$$THI = 0.4(td+tw)+15$$
$$THI = .55td + 0.2tpd + 17.5$$
$$THI = td - (0.55 - 0.55RH)(td - 58)$$

where THI is the temperature-humidity index in units.

$td$=dry-bulb (air) temperature
$tw$=wet-bulb temperature ° F.
$tdp$=dew point temperature ° F.
$RH$=relative humidity in percent (in the equations RH is used as a decimal—0.35 is used as 35 percent)

Thus the temperature-humidity index can be obtained by using the simultaneous reading of the dry bulb and either the wet bulb, dew point, or relative humidity readings.

It is a general object of this invention to provide a novel instrument which indicates the temperature and relative-humidity and registers the temperature-humidity index on an appropriate scale.

A further object of the invention is to provide a novel instrument in which the thermometer and hygrometer are arranged to register on a common scale and in which the parts are arranged in an efficient cooperative assembly.

The invention comprehends in one embodiment of the invention a novel arrangement of a bulb and stem type of thermometer in which the thermometer is mounted in the support leg of the instrument casing so that only the effective portion of the stem projects into the casing.

A different object of the invention is to provide in several embodiments thereof a hygrometer with an indicator which has one hand registering on a relative humidity scale and another hand registering on a temperature-humidity-index scale which has indicia which provides a temperature graduation or scale for a thermometer.

Another object of the invention is to provide a novel instrument in which several recording instruments combine to give a reading on a common simplified scale.

More specifically in the preferred embodiments of the invention there is provided a temperature-humidity-index graph arranged in an arc about the axis of a hygrometer which comprises an indicator carrying pivot about which the graph is oriented, the indicator having one hand directed to a relative humidity scale oriented about the pivot and having another hand with a temperature-humidity-index scale registering against the graph lines which in turn register with a thermometer.

These and other objects and advantages inherent in and encompassed by the invention will become more readily apparent from the specification and the drawings wherein:

FIGURE 1 is a front elevational view of one embodiment of the invention partly broken away and in section generally on line 1—1 of FIGURE 2;

FIGURE 2 is a side elevational view partly in vertical section taken substantially on line 2—2 of FIGURE 1;

FIGURE 3 is a front-elevation of another embodiment of the invention;

FIGURE 4 is a top view partly in section on line 4—4 of FIGURE 3;

FIGURE 5 is an enlarged vertical sectional view taken substantially on line 5—5 of FIGURE 4;

FIGURE 6 is an enlarged fragmentary sectional view on line 6—6 of FIGURE 3;

FIGURE 8 is a front elevational view of a further embodiment of the invention;

FIGURES 9 and 10 are front elevational views of still another embodiment of the invention.

*Description of FIGURES 1 and 2*

Figure 10:
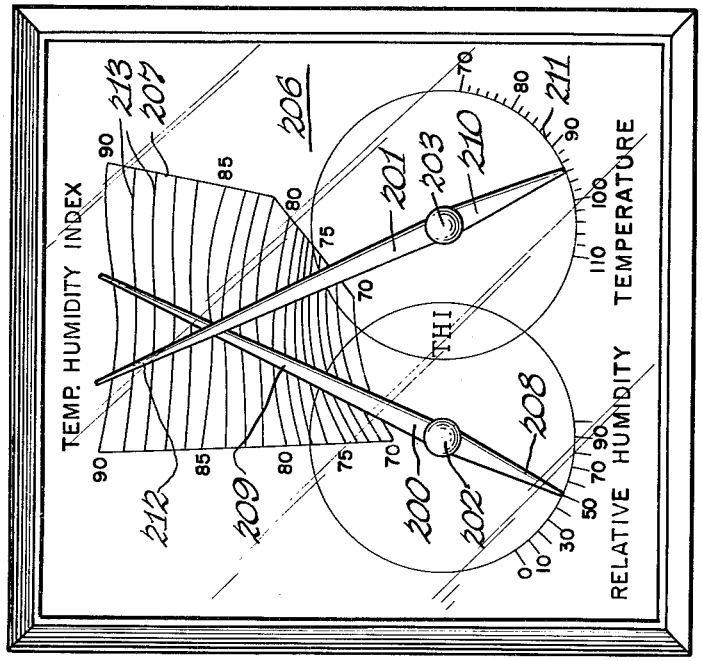

Describing the invention in detail and having particular reference to the drawings there is shown in FIGURES 1 and 2 the novel multimeter generally designated 2 which comprises a frusto-conical casing 3 having a perforated rear cover 4 and an annular front bezel 5 which admits a face plate 6 therein.

The face plate 6 is wedged along its periphery 7 against the internal frusto-conical surface 8 of the shell portion 9 of casing 3 and is retained in position with the glass crystal 10 against the inturned bezel lip or flange 5 which clamps as at 12 against the convex external side 13 of the crystal.

The crystal 10 is concavo-convex and provides a space 14 with the external side 15 of the face plate 6 to permit rotation of an indicator 16 with the pivot pin 17 to which it is secured, the pin 17 extending through an aperture 18 in plate 6 beyond its rear side 19 and being secured to one end 20 of a conventional spiral-spring-controlled wick structure 21 of the hygrometer 22. The other end of the wick structure 21 is anchored on a pin 23 which serves to secure the flange 24 of a bracket or clip 25 which has a pair of leg portions 26, 27 and an interconnecting spanner portion 28, the leg portion 26 merging into the flange 24 and extending rearwardly from the face plate. Leg portion 26 has a notch 29 receiving the upper end 30 of a thermometer stem 31 which seats against the back side 19 of the plate 6 in transverse alignment with a radially extending vertically elongated window opening 32 in the lower half of the face plate 6. The spanner portion 28 of the bracket extends behind the stem 31 and at its lower end merges into the leg portion 27 which is bifurcated to provide a notch 33 which receives the back side of the stem 31 therein and presses the stem on its front side 34 against the back 19 of the face plate.

The thermometer stem 31 extends downwardly from the casing through a vertical opening 35 in the wall of the casing and extends into a hollow center leg or stand 36 which has a front wall 37, side walls 38 and bottom wall 39, the leg 36 having an open back side 39' for admitting ambient air to the thermometer bulb 40 at the lower end of the stem 31.

The instrument is supported by the center leg 36 and the U-shaped leg structure or bail 42 which comprises a pair of legs 43 each being admitted into an opening 44 in the rear wall of the casing. The legs 43 are sprung toward each other and this bias releasably retains them in the rear wall while the bight portion 45 seats against a supporting surface.

If desired, the leg structure 42 may be eliminated and the instrument hung from a nail on a wall by the keyhole opening 46 in the rear wall 4.

The face plate 6 is provided with a graph 47 comprising a series of graph lines 48 which sweep about the pivot pin 17, these lines having one of their ends along the vertical edge 49 of the window 32 and these lines at this end are equally spaced in graduations corresponding to readings on the thermometer. Each line is carefully plotted in accordance with the formulas heretofore disclosed so that at a given temperature reading and relative humidity indication by the hand portion 50 of the indicator 16 a corresponding temperature-humidity-index reading is obtained against the scale on the hand 51 of the indicator 16.

It will be seen that the relative humidity scale 52 is concentric with the pivot axis of the indicator whereas the graph lines are not since they are a function of temperature and relative humidity.

The temperature-humidity-index scale 53 is indicated THI on the hand 51 and is in even increments along the hand 51.

In order to read the THI the user follows the indicated temperature line and reads the same against the THI scale 53 on the hand 51.

In the instant design, it will be noted that the leg 36 functions to conceal and safeguard the stem 31 and the extension of the stem out of the casing permits of a small window to expose only the useful range of the thermometer. In this design, the narrow end of the graph is utilized permitting a smaller thermometer and thus a smaller overall unit.

*Embodiments of FIGURES 3–6*

In this embodiment parts which are identical with those of the previous structure are identified by corresponding reference numerals. In this arrangement the thermometer is enlarged and is positioned in a horizontally elongated window 75 in the face plate 6a.

The THI graph lines are located entirely on the lower half of the face plate 6 and the spread or broad end of the graph lines terminate at the theremometer graduations along the lower edge 76 of the window 75.

The thermometer stem 31a is held in clips 77, 78 suitably welded or soldered to the back side of the face plate 6a.

The casing 3a is of modified shape and conventional mounting of the glass crystal is employed.

The stem 31 of the thermometer is between the plate 6a and the hygrometer coil element 21 which is anchored to the plate 6a by the pin 23.

Figure 7:
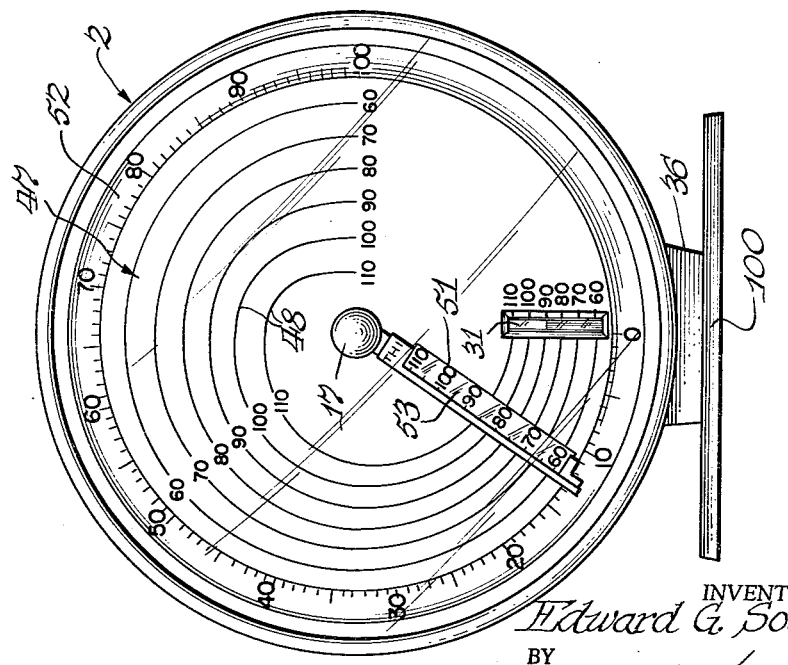
FIGURE 7 is a front elevational of another form of the invention.

*Embodiment of FIGURE 7*

The embodiment of FIGURE 7 is a combination of the two previous embodiments and like parts are identified with the same reference characters.

In this design, leg 36 is integrated with a base 100. The relative humidity scale 52 is enlarged and together the graph scale 47 proceeds 270° about the face, each line 48 representing the temperature which is read at the thermometer. The location where the instant temperature line crosses the scale on hand 51 determines the THI.

*Embodiment of FIGURE 8*

In this embodiment parts which correspond to the previous embodiment are identified with corresponding reference numerals. In this design, the indicator 16 has its hand portion 51 color coded with bars 125, 126, 127, 128 and 129 for different temperature ranges with a key bar 130 on the face plate 6b.

The thermometer 30a is vertically disposed in alignment with the window 32.

The graph lines 48 intersect the window 32 at intervals corresponding to the temperature graduations.

It will be apparent that to read the THI the user extends the instant temperature along the respective graph line and compares its intersection with the respective THI scale segment.

*Embodiment of FIGURES 9 and 10*

FIGURES 9 and 10 are comparable in that each comprise separate coil element operated indicators 200, 201 having a pivot pin 202, 203 connected to respective temperature and humidity actuated coil elements 204, 205 mounted on face plate 206.

A THI graph 207 is inscribed on the face plate.

The indicator 200 has hand 208 registering with a relative humidity scale on the face plate 206 and a hand 209 sweeping over the graph 207.

Indicator 201 has hand 210 registering with the temperature scale 211 and a hand 212 sweeping over the graph.

The graph lines 213 of the graph are so arranged that the intersection of the hands 209, 212 gives a THI reading.

Thus, in each embodiment, a novel instrument has been disclosed which obtains a reading of the THI. Each embodiment locates a graph on the face plate and correlates the temperature and relative huimidity with the THI.

Having disclosed several embodiments of the invention, it will become apparent that other designs will become readily apparent which are intended to be covered as set forth in the appended claims.

I claim:

1. An instrument for indicating a temperature humidity index member comprising a support structure including a face plate, a calibrated temperature humidity index graph on the face plate, a hygrometer mounted on the support and having a hand sweeping over the graph, a thermometer having temperature indicating means, said graph having lines registering at selected points with the temperature indicating means and a temperature-humidity-index scale on the hand registering with the graph lines.

2. In a device of the class described, a housing, a face plate mounted therein, a hygrometer mounted in the housing and having a pivot member extending through said face plate, a temperature-humidity-index graph on the face plate having lines oriented about said pivot, a thermometer mounted in the housing and having a stem with temperature indicia therein registering against the graph, a hand connected to the pivot member sweeping over the graph and having a temperature-humidity scale thereon registering against the graph in intersecting relation to the temperature indication on the graph.

3. In an instrument of the class described, a casing having a peripheral wall, a face plate mounted within said peripheral wall, said plate having an upright elongated window, a hygrometer having a pivot member extending through said plate, a temperature-humidity-index graph oriented about said pivot and having lines providing a temperature graduation along one edge of the window, an upright thermometer having a stem extending behind the window with temperature media therein registering with the temperature graduations and having a bulb at the lower end of the stem below the peripheral wall, a leg on the casing encompassing the bulb in shielding relation thereto, and an indicator on the pivot member sweeping over the graph and having a scale thereon registering with the graph lines.

4. The invention according to claim 3, and said graph lines extending at opposite sides of the window.

5. A meteorological instrument having a casing with a peripheral wall, a face plate mounted within the wall, a hygrometer having a pivot element projecting through said plate, a temperature-humidity-index scale on the plate having arcuate temperature-humidity-index lines oriented about said element, a thermometer mounted behind said plate, said plate having a window intersecting said lines, said thermometer registering against said lines, and an indicator carried on the element and having a temperature-humidity-index scale registering with said lines of the scale to provide a reading thereagainst.

6. The invention according to claim 5, and said thermometer and window being disposed essentially horizontally.

7. The invention according to claim 5, and said thermometer and window being disposed substantially vertically below the pivot element and said thermometer having a lower end portion projecting without the housing and a hollow leg structure connected to the wall and receiving the lower end portion of the thermometer therein.

8. In a meteorological instrument, a temperature-humidity-index graph, a thermometer and a hygrometer registering against said graph and providing indicia at the intersection of their respective readings a reading against the graph and said thermometer being of the bulb and stem type having the stem oriented to the graph to provide temperature readings thereon, and said hygrometer having a hand with a color scale indicia thereon readable against the graph.

9. In an instrument of the class described, a casing having an annular peripheral wall, a face plate fitted within said wall, and having a vertical window therein, a relative humidity scale on said face plate oriented in an arc about the center of the plate, a hygrometer having a pivot member projecting through the center of the plate, a temperature-humidity-index graph having value lines oriented about said pivot member and having portions intersecting said window and providing evenly spaced graduations therealong, a thermometer mounted in the casing and having a stem in alignment with the window and calibrated against said graduations, and said casing having a hollow portion depending therefrom in alignment with the window and receiving the lower end of the thermometer therein.

References Cited by the Examiner
UNITED STATES PATENTS

| | | | |
|---|---|---|---|
| 2,037,637 | 4/36 | Lingo | 73—336 X |
| 2,874,571 | 2/59 | Hevener | 73—336 |
| 3,048,038 | 8/62 | Johnson | 73—338 |
| 3,053,090 | 9/62 | Ingersoll et al. | 73—336 |
| 3,095,742 | 7/63 | Pelishek | 73—336 |

FOREIGN PATENTS

| | | |
|---|---|---|
| 2,078 | 1881 | Great Britain. |
| 444,274 | 3/36 | Great Britain. |

OTHER REFERENCES

"Temperature-Humidity Index," United States Weather Bureau publication, August 1959.

ISAAC LISANN, *Primary Examiner.*